July 22, 1969  J. PHILLIPS ET AL  3,457,441

LEAD ARRANGEMENT

Filed Dec. 5, 1966

Inventors
Jerome Phillips
Robert A. Gipps
By Joseph A. Genovese
Attorney

United States Patent Office 3,457,441
Patented July 22, 1969

3,457,441
LEAD ARRANGEMENT
Jerome Phillips and Robert A. Hipps, Owosso, Mich., assignors to Controls Company of America, Melrose Park, Ill., a corporation of Delaware
Filed Dec. 5, 1966, Ser. No. 599,187
Int. Cl. H02k 11/00
U.S. Cl. 310—71    10 Claims

ABSTRACT OF THE DISCLOSURE

This invention relates to sealing a lead in a motor housing by using a resilient body that surrounds the lead and extends over the area of the housing immediately adjacent the lead opening. A retaining plate compresses the resilient material to lock the lead in place. The plate is held in position by deformed portions of the housing.

---

This invention relates to lead arrangements for electrical apparatus and, more particularly, to an improvement in the seal arrangement at the point of entry of electrical leads into an electric motor housing.

A general object of this invention is to provide an improved and simplified manner of attaching leads to the housing of electrical apparatus such as an electric motor.

A further object of this invention is to provide an improved lead support arrangement which both seals the point of entry into the housing of an electrical apparatus and also provides strain relief for the electrical leads.

Another object of this invention is to provide an improved and simplified arrangement for sealing the point of entry of electrical leads into a motor housing, and one which facilitates not only support of the leads at the housing but also attachment of the leads within the housing.

For the achievement of these and other objects, this invention proposes use of a portion of the housing of the motor, or other electrical apparatus, as one of the clamping surfaces for a resilient body which provides the seal at the point of entry of the lead, or leads, into the housing. The resilient body surrounds the lead and extends over the area of the housing immediately adjacent the lead opening in the housing. A retaining plate is positioned with the resilient body arranged between it and the housing. The retaining plate compresses the resilient body against the housing around the lead opening to provide a seal at the lead. Preferably, the area of the housing around the opening is recessed and the resilient body is arranged within the recess; tabs are deformed from the housing around the recess to hold the retaining plate in compressive engagement with the resilient body; and the lead openings taper inwardly from the housing surface with the resilient body extending into the openings and being wedged between the opening walls and the leads.

Other objects and advantages will be pointed out in, or be apparent from, the specification and claims, as will obvious modifications of the embodiment shown in the drawings, in which:

Figure 1:
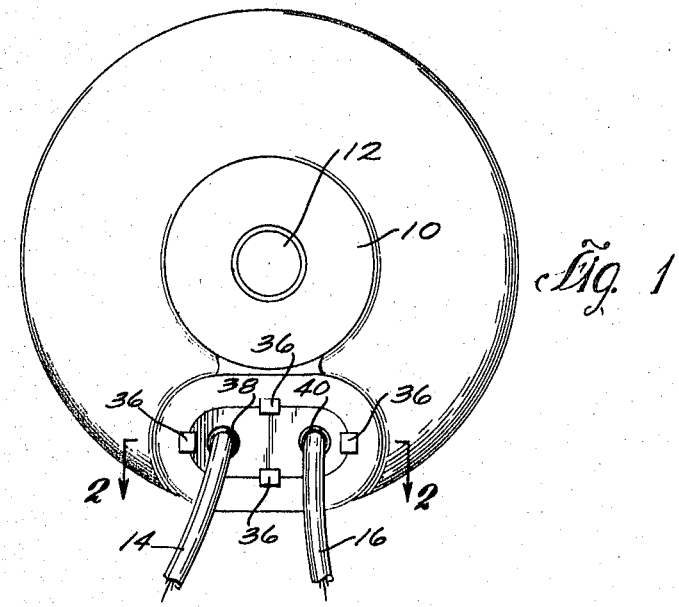
FIG. 1 is an end view of a motor end plate constructed in accordance with this invention.
Figure 2:
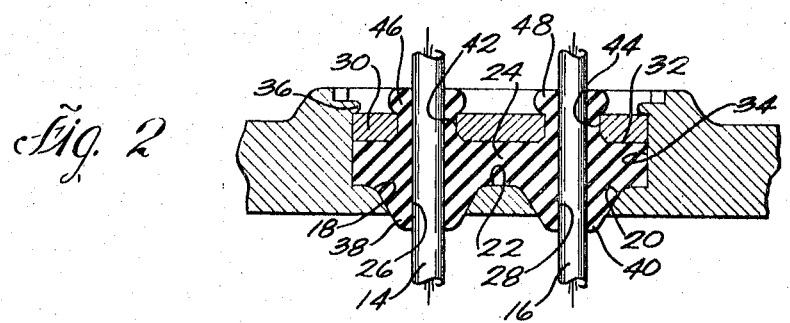
FIG. 2 is a section view taken generally along line 3—3 of FIG. 1.

With particular reference to the drawings, the invention is illustrated as embodied in an electric motor of conventional construction and, since the basic motor structure is conventional, only an end view is illustrated in the drawings.

Motor end plate 10 supports a conventional bearing assembly 12 which in turn supports the motor armature (not shown) for rotation. Electrical leads 14 and 16 pass through the end plate into the motor interior for suitable connection to either a brush card or the motor field coils. The actual connections of the leads within the housing are conventional and hence have not been illustrated.

This invention is concerned with the construction at the point of passage of the leads through the motor housing.

Figure 3:
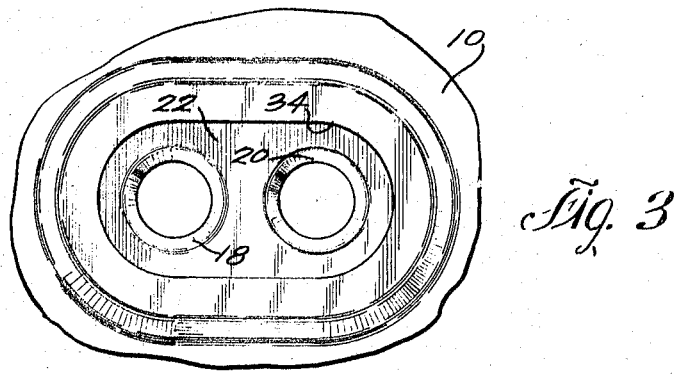
FIG. 3 is an end view of the recessed area of the housing with the resilient body and retaining plate removed.

Leads 14 and 16 extend through openings 18 and 20 in the housing. A flat, generally planar surface 22 surrounds the openings. Body 24, of rubber or other resilient material, engages surface 22 and includes lead openings 26 and 28. The leads extend through the end plate and body 24 as illustrated in FIG. 3. A rigid retaining plate 30, which is also generally planar, extends over and engages the exposed surface 32 of the resilient body. Preferably the plate extends parallel to surface 22 and is held in compressive engagement with the resilient body. This clamps the body between the plate and surface 22 urging the body into sealing engagement with the leads and openings 18 and 20.

In the illustrated embodiment, surface 22 is surrounded by a wall 34 extending generally normal to the surface. Preferably a portion of the wall is recessed into the end plate and the remainder of the wall projects outwardly from the end plate. Wall 34 defines a confined, recessed area in the end plate for receipt of resilient body 24. Body 24 and the retaining plate are positioned in the area defined by wall 34 and this permits a particularly simple arrangement for fastening the plate in position to maintain the desired compressive engagement with body 24. More particularly, wall 34 is staked, or otherwise suitably deformed, to provide tabs 36 engaging the exposed surface of the plate. The tabs prevent release of the retaining plate which would relax the compression exerted on the resilient body. This arrangement provides an effective seal with a minimum of structural elements by making maximum utilization of the motor housing in providing the seal and connection.

To improve the seal at openings 18 and 20, the openings are generally conical, tapering inwardly from surface 22. Resilient body 24 is provided with generally conical projections 38 and 40 which define extensions of openings 26 and 28 and have a shape complementary to that of conical openings 18 and 20. Projections 38 and 40 extend into the openings. When the resilient body is compressed between surface 22 and plate 30, the force exerted on body 24 is generally in a direction parallel to the axis of openings 18 and 20. This forces projections 38 and 40 into the openings and produces a wedging action of projections 38 and 40 between the walls of openings 18 and 20 and leads 14 and 16. This then substantially enhances the seal afforded at the opening. The wall 34 and the projection of the resilient body into the lead openings counteract any tendency of the resilient body to move away from the leads under compression to thereby contribute to enhancing the seal.

It will also be noted that plate 30 is provided with openings 42 and 44 and that projections 46 and 48 are provided on the outer surface 32 of the resilient body. These projections extend into the retaining plate openings thereby confining the resilient material about the leads to further contribute to the compressive engagement and effective seal which is achieved between the resilient body and the leads.

With this arrangement it will now be evident that an effective seal is provided at the point of entry of leads 14 and 16 into the motor housing. It has also been noted that the sealing force produced by this arrangement is sufficiently large to achieve a strain relief connection for the electrical leads. More particularly, after the retaining plate is assembled and staked in position the holding force between the leads and the body is so great that a considerable force in an axial direction is necessary to overcome the frictional engagement between the resilient body and the leads and withdraw the leads from the resilient body. This force is sufficient to isolate the internal motor connections from most pulling forces to which the leads might be subjected in normal usage of the motor.

Moreover, with this arrangement the assembly of the motor and the connection of the leads within the motor housing is facilitated. Before the retaining plate is staked in position ample lead length can be drawn through the end plate to permit facile connection of the leads to either the brush card or the field coils. After the electrical connection is made the leads are withdrawn through the resilient body and the retaining plate is pressed onto the resilient body with the desired compressive force. Tabs 36 are staked to hold the retaining plate in that position and the attachment of the leads is completed.

It will be appreciated that although the point of entry into the motor housing is shown as passing through the motor end plate, which is part of the motor housing, other points of entry to the motor could be used depending upon the interior motor structure. Accordingly, this invention is not intended to be limited to entry of the electrical leads through any particular point on the housing of a motor or other electrical apparatus.

Although but one embodiment of the present invention has been illustrated and described, it will be apparent to those skilled in the art that various changes and modifications may be made therein without departing from the spirit of the invention or from the scope of the appended claims.

We claim:
1. In an electric motor,
a motor housing,
means defining an opening into said housing,
an electrical lead extending through said opening,
a resilient body surrounding said lead and extending into said opening and over at least a portion of the housing surface immediately surrounding said opening, said resilient body being in engagement with said housing at said housing surface portion,
retaining means at said opening and engaging said resilient body,
said resilient body positioned between said retaining means and said portion of said housing surface,
a portion of said motor housing extending around at least a portion of the edge of said resilient body,
and fastening means comprising portions deformed from the portion of said housing surrounding said resilient body edge and engaging and holding said retaining means in compressive engagement with said resilient body compressing said body into sealing engagement with said housing around said lead at said opening.

2. The combination of claim 1 wherein said opening tapers inwardly away from said resilient body,
wherein said resilient body extends into said tapered opening,
and wherein said retaining means exerts said compressive force on said resilient means in a direction generally parallel to the axis of said opening to urge said resilient body into sealing engagement with the tapered walls of said opening.

3. In an electric motor,
a motor housing,
means defining an opening into said housing,
an electrical lead extending through said opening,
a resilient body surrounding said lead and extending over at least a portion of the housing surface immediately surrounding said opening, said resilient body being in direct engagement with said housing at said housing surface portion,
retaining means at said opening and extending over the portion of said housing surface engaged by said resilient body,
said resilient body positioned between said retaining means and said portion of said housing surface,
and fastening means connected between said motor housing and retaining means and holding said retaining means in compressive engagement with said resilient body compressing said resilient body into sealing engagement with said lead and said opening.

4. The combination of claim 3 wherein said opening tapers inwardly away from said resilient body,
said resilient body includes a portion extending into said opening,
and said retaining means exerts said compressive force on said resilient body in a direction generally parallel to the axis of said opening to urge said resilient body into sealing engagement with the tapered walls of said opening.

5. The combination of claim 3 wherein said housing includes a wall portion extending around a portion of said housing surface and projecting outwardly from said housing surface,
said resilient body is disposed within and engages said wall portion and said portion of said housing surface,
said retaining means comprises a plate extending over said resilient body,
and said fastening means comprises deformed portions on said wall portions engaging said plate.

6. The combination of claim 5 wherein said opening tapers inwardly away from said resilient body,
said resilient body includes a generally conical portion disposed in said tapered opening,
and said retaining plate and fastening means exert said compressive force on said resilient body in a direction generally parallel to the axis of said opening to urge said resilient body into sealing engagement with the tapered walls of said opening.

7. The combination of claim 6 wherein said plate includes an opening, and wherein said lead and a portion of said resilient body extend into said plate opening.

8. The combination of claim 6 wherein said first-mentioned means defines two openings into said housing through said portion of said housing surface with each opening tapering away from said resilient body,
a lead passing through each opening in said housing surface,
and said resilient body including projections extending into each of said tapered openings.

9. The combination of claim 5 wherein
said portion of said housing surface is planar,
said first-mentioned means defines first and second relatively spaced openings into said housing through said planar surface,
an electrical lead extending through each opening,
said retaining plate is generally parallel to said planar surface and includes first and second openings with said leads extending through said openings,
and said fastening means being deformed from said housing around said recess.

10. The combination of claim 9 wherein said openings in said planar surface are generally conical and taper inwardly from said planar surface and said resilient body includes first and second generally conical portions extending into said conical openings.

References Cited
UNITED STATES PATENTS

| | | | |
|---|---|---|---|
| 2,406,852 | 9/1946 | Relf | 174—153 |
| 2,639,313 | 5/1953 | Street | 174—152 |
| 2,684,401 | 7/1954 | Roeser | 174—153 |
| 2,840,262 | 6/1958 | Learmonth | 174—152 |
| 2,881,406 | 4/1959 | Arson | 310—71 |
| 2,813,692 | 11/1957 | Bremer | 174—152 |
| 2,965,038 | 12/1960 | Purden | 174—152 |
| 3,043,903 | 7/1962 | Keane | 310—71 |
| 3,155,770 | 11/1964 | Hollenden | 174—153 |
| 3,294,993 | 12/1966 | Komor | 310—71 |
| 3,295,083 | 12/1966 | Fiore | 310—71 |

J. D. MILLER, Primary Examiner

U.S. Cl. X.R.

174—65, 152; 339—103